United States Patent
Zink et al.

(10) Patent No.: US 12,208,356 B1
(45) Date of Patent: Jan. 28, 2025

(54) VAPOR RECOVERY METHOD, SYSTEM, AND APPARATUS USING REVERSAL OF ADSORPTION FLOW

(71) Applicant: ZEECO, INC., Broken Arrow, OK (US)

(72) Inventors: Darton J. Zink, Tulsa, OK (US); Michael J. Frederick, Warsaw (PL); James W. Stamm, Louisville, KY (US); Gregory V. Seefeldt, Jenks, OK (US)

(73) Assignee: ZEECO, INC., Broken Arrow, OK (US)

( * ) Notice: Subject to any disclaimer, the term of this patent is extended or adjusted under 35 U.S.C. 154(b) by 734 days.

(21) Appl. No.: 17/512,760

(22) Filed: Oct. 28, 2021

(51) Int. Cl.
*B01D 53/047* (2006.01)
*B01D 53/04* (2006.01)

(52) U.S. Cl.
CPC ....... *B01D 53/047* (2013.01); *B01D 53/0446* (2013.01); *B01D 2253/102* (2013.01); *B01D 2256/24* (2013.01); *B01D 2257/504* (2013.01); *B01D 2257/80* (2013.01); *B01D 2259/402* (2013.01); *B01D 2259/4516* (2013.01)

(58) Field of Classification Search
CPC ............ B01D 53/047; B01D 2253/102; B01D 2257/504
See application file for complete search history.

(56) References Cited

U.S. PATENT DOCUMENTS

| | | |
|---|---|---|
| 3,867,111 A | 2/1975 | Knowles |
| 4,066,423 A | 1/1978 | McGill et al. |
| 4,261,716 A | 4/1981 | Schwartz et al. |
| 4,276,058 A | 6/1981 | Dinsmore |
| 4,343,629 A | 8/1982 | Dinsmore et al. |
| 4,331,456 A | 10/1982 | Schwartz et al. |
| 5,154,735 A | 10/1992 | Dinsmore et al. |
| 5,345,771 A | 9/1994 | Dinsmore |
| 5,871,568 A | 2/1999 | Gibson |
| 6,486,375 B1 | 11/2002 | Lenhart et al. |

FOREIGN PATENT DOCUMENTS

| | | |
|---|---|---|
| CA | 1121983 | 4/1982 |
| EP | 0135306 | 7/1984 |

*Primary Examiner* — Sharon Pregler
(74) *Attorney, Agent, or Firm* — Dennis D. Brown; Brown Patent Law, P.L.L.C.

(57) ABSTRACT

A vapor recovery method, system, and apparatus for extending the replacement period of the activated carbon or other adsorbent material used in a vapor recovery unit by alternating each of the one or more adsorption vessels used in the vapor recovery unit between a bottom-up adsorption mode, in which the inlet vapor stream flows upwardly through the adsorbent material, and a top-down adsorption mode in which the inlet vapor stream flows downwardly through the adsorbent material.

32 Claims, 2 Drawing Sheets

VAPOR RECOVERY METHOD, SYSTEM, AND APPARATUS USING REVERSAL OF ADSORPTION FLOW

FIELD OF THE INVENTION

The present invention relates to methods, systems, and apparatuses for recovering vaporized hydrocarbons released from sources such as tanker trucks, railway tank cars, tanker ships, and other vessels as they are loaded with gasoline, diesel, or other hydrocarbon liquids, and from other sources.

BACKGROUND OF THE INVENTION

One type of vapor recovery unit (VRU) used for recovering hydrocarbon vapors released, for example, when loading tanker trucks, railway tank cars, tanker ships, and other vessels with gasoline, diesel, or other hydrocarbon liquids uses one or more, typically a pair, of adsorption vessels which contain beds of activated carbon or other solid adsorbent material. The vapor stream generated by the loading operation will typically comprise a mixture of the released hydrocarbon vapor and air. The two adsorption vessels in a typical VRU will be operated in alternating stages in which (a) while the vapor stream is being delivered through a first of the vessels in an adsorption mode, the second vessel will be operating in a regeneration mode and then (b) when the adsorbent bed in the second vessel has been sufficiently regenerated and the second vessel is switched to the adsorption mode, the first vessel will be switched to the regeneration mode.

In the adsorption stage conducted in each of the adsorption vessels, the hydrocarbon vapor in the vapor stream from the loading operation is adsorbed and separated from the vapor stream as the vapor stream flows through the bed of activated carbon or other adsorbent material in the adsorption vessel. The remaining air from the vapor inlet stream is typically vented to atmosphere.

In the regeneration stage conducted in each of the adsorption vessels, the flow of the vapor stream to the adsorption vessel is stopped and the pressure in the vessel is reduced, typically to a very low pressure of about −950 mbarg, using a vacuum pump or other suitable vacuum draw system. At such reduced pressure, the adsorbed hydrocarbon vapor is released (desorbed) from the activated carbon or other adsorbent material in the adsorption vessel and the desorbed hydrocarbon vapor stream is pumped or otherwise delivered to the bottom of a wet scrubber, also referred to as an absorber tower. As the desorbed hydrocarbon vapor stream is delivered upwardly through a packed section of the adsorber tower, the desorbed hydrocarbon vapor stream condenses as it is contacted by an absorbent stream, e.g., gasoline, which is flowing downwardly through the packed section. The absorbent stream, which absorbs and is slightly enriched by the condensed hydrocarbon vapor, is then returned to storage.

In at least most of the VRU's currently used in the art, the vapor stream generated by the loading operation is delivered through each of the adsorption vessels in a bottom-up flow regime in which the vapor stream flows vertically upward through the bed of activated carbon or other adsorbent material in the adsorption vessel. Unfortunately, as the vapor stream flows upwardly through the adsorption vessel, most of the hydrocarbon vapor in the vapor stream is adsorbed in just the lower one-third of the adsorption bed. As a result, the adsorption efficiency of the adsorbent material declines much more rapidly in the lower one-third of the bed than in the middle one-third and upper one-third sections.

Typically, after about five to ten years of use, although the adsorption efficiency of the mid-third, and upper-third sections of the adsorbent bed will have declined by only about 20%, the efficiency of the bottom-third section will have declined by from 40% to 60% and will therefore be in need of replacement. Unfortunately, because the bottom-third section of the bed of activated carbon or other adsorbent material cannot be replaced without also removing the middle and upper sections of the bed, the entire bed is typically replaced when the bottom one-third section is depleted.

As used herein and in the claims, references to the efficiency of the adsorbent material being reduced, e.g., by 20%, 25%, 30%, 35%, 40%, 60%, 65%, 70%, or 75% mean, respectively, that the weight amount of hydrocarbon vapor adsorbed by a given volume of the adsorbent material when operating in the adsorption mode is 20%, 25%, 30%, 35%, 40%, 60%, 65%, 70%, or 75% less than when the adsorbent material was new.

In an effort to address these problems, some in the art have built VRUs in which the vapor stream is delivered downwardly through the beds of adsorbent material in the adsorption vessels so that the upper one-third, rather than the bottom one-third, of the bed has been more rapidly depleted. This has, to some degree, allowed the upper one-third of the bed to be replaced without having to also remove the bottom and middle sections of the bed. However, even in the top-down scenario, the VRU must still be taken out of service after just five to ten years of operation when the upper section of the bed of adsorbent material is depleted.

Consequently, a need exists for an improved VRU system which will (a) provide efficient use of the entire bed of activated carbon or other adsorbent material before the replacement of any section of the bed is needed, (b) significantly lengthen the replacement period for the adsorbent material, (c) reduce the unit downtime needed for replacing the absorbent material, and (d) significantly reduce the amount and cost of the activated carbon or other adsorbent material needed over time.

SUMMARY OF THE INVENTION

The present invention satisfies the needs and alleviates the problems discussed above by providing an improved method, system, and apparatus for vapor recovery in which the one or more adsorption vessels of the VRU is/are transitioned, either once or repeatedly, between a bottom-up adsorption cycle and a top-down adsorption cycle. The inventive VRU system and apparatus can be built as new or can be provided by retrofitting an existing VRU. The inventive VRU method, system, and apparatus (a) allow the VRU to continue to operate until both the lower and the upper sections of the activated carbon or other adsorbent material in the adsorption vessels are depleted, (b) extend the current five to ten year replacement or partial replacement period for the beds of adsorbent material by an additional three to five years, and (c) reduce the downtime of the VRU by significantly extending the replacement or partial replacement period for the adsorbent material and by eliminating the need to separate deplete sections of the adsorbent bed from partially depleted sections. In addition, because of these and other improvements, the present invention also significantly reduces the amount and cost of the adsorbent material used and reduces the costs and losses associated with downtime.

In one aspect, there is provided a method of extending a replacement period of an adsorbent material used in a vapor recovery unit, wherein the vapor recovery unit includes one or more adsorption vessels and each of the one or more adsorption vessels has a bed of the adsorbent material therein. For each of the one or more adsorption vessels, the method preferably comprises the steps of (a) operating the adsorption vessel in one or more bottom-up cycles and (b) operating the adsorption vessel in one or more top-down cycles.

Each of the one or more bottom-up cycles of step (a) of this method of extending the replacement period of the adsorbent material preferably comprises once or repeatedly operating the adsorption vessel in a bottom-up adsorption mode followed by a regeneration mode. The bottom-up adsorption mode comprises flowing a vapor inlet stream comprising a hydrocarbon vapor upwardly through the bed of the adsorbent material in the adsorption vessel to remove at least most of the hydrocarbon vapor from the vapor inlet stream. The regeneration mode of step (a) comprises stopping the upward flow of the vapor inlet stream through the bed of the adsorbent material in the adsorption vessel and reducing the pressure in the adsorption vessel.

Each of the one or more top-down cycles of step (b) of this method of extending the replacement period of the adsorbent material preferably comprises once or repeatedly operating the adsorption vessel in a top-down adsorption mode followed by a regeneration mode. The top-down adsorption mode comprises flowing the vapor inlet stream downwardly through the bed of the adsorbent material in the adsorption vessel to remove at least most of the hydrocarbon vapor from the vapor inlet stream. The regeneration mode of step (b) comprises stopping the downward flow of the vapor inlet stream through the bed of the adsorbent material in the adsorption vessel and reducing the pressure in the adsorption vessel.

In addition to the above, the method of extending the replacement period of the adsorbent material can also include further steps such as: (c) conducting the one or more bottom-up cycles until an adsorption efficiency of a bottom one-third of the bed of the adsorbent material in each of the adsorption vessels is reduced by at least 25% but not more than 75%; (d) conducting the one or more top-down cycles until an adsorption efficiency of a top one-third of the bed of the adsorbent material in each of the adsorption vessels is reduced by at least 25% but not more than 75%; and (e) replacing the entire bed of adsorbent material in each of the adsorption vessels after steps (c) and (d).

In another aspect, there is provided a method of vapor recovery in a vapor recovery unit having one or more adsorption vessels, wherein each of the adsorption vessels has a bed of an adsorbent material therein and, for each one of the one or more adsorption vessels, the method preferably comprises steps of (i) operating the adsorption vessel in one or more bottom-up cycles and (ii) operating the adsorption vessel in one or more top-down cycles.

Each of the one or more bottom-up cycles in step (i) of this method of vapor recovery preferably comprises once or repeatedly operating the adsorption vessel in a bottom-up adsorption mode followed by a regeneration mode. The bottom-up adsorption mode comprises flowing a vapor inlet stream comprising a hydrocarbon vapor upwardly through the bed of the adsorbent material in the adsorption vessel to remove at least most of the hydrocarbon vapor from the vapor inlet stream. The regeneration mode of step (i) comprises stopping the flow of the vapor inlet stream through the bed of the adsorbent material in the adsorption vessel and reducing a pressure in the adsorption vessel by drawing a vacuum from below the bed of the adsorbent material in the adsorption vessel.

Each of the one or more top-down cycles in step (ii) of this method of vapor recovery preferably comprises once or repeatedly operating the adsorption vessel in a top-down adsorption mode followed by a regeneration mode. The top-down adsorption mode comprises flowing the vapor inlet stream downwardly through the bed of the adsorbent material in the adsorption vessel to remove at least most of the hydrocarbon vapor from the vapor inlet stream. The regeneration mode of step (ii) comprises stopping the flow of the vapor inlet stream through the bed of the adsorbent material in the adsorption vessel and reducing the pressure in the adsorption vessel by drawing a vacuum from above the bed of the adsorbent material in the adsorption vessel.

In another aspect, there is provided a method of extending a replacement period for an adsorbent material used in a vapor recovery unit, wherein the method preferably comprises the initial step (a) of providing a vapor recovery unit comprising two adsorption vessels, each of the two adsorption vessels having: (i) a bed of the adsorbent material therein, (ii) a vapor inlet line connected to a lower inlet of the adsorption vessel located below the bed of the adsorbent material, (iii) a vapor inlet valve provided in the vapor inlet line, (iv) a vacuum draw line extending from the vapor inlet line, (v) a vacuum line valve provided in the vacuum draw line, (vi) a vent line extending from a vent outlet of the adsorption vessel located above the bed of the adsorbent material, (vii) a vent valve provided in the vent line, (viii) a first connection which is provided on the vapor inlet line and is temporarily closed, (ix) a second connection which is located on a top-down vapor inlet of the adsorption vessel and is temporarily closed, the top-down vapor inlet being located above the bed of the adsorbent material and/or having an internal line and/or internal flow distributor which extends from the second connection and has a discharge located inside the adsorption vessel above the bed of the adsorbent material, (x) a third connection which is temporarily closed and is located either on the vacuum draw line upstream of the vacuum line valve or on the vapor inlet line, and (xi) a fourth connection which is located on the vent line and is temporarily closed.

Following step (a), this method of extending the replacement period for the adsorbent material preferably comprises the step (b) of operating the two adsorption vessels in alternating modes in which when a first of the two adsorption vessels is operating in a bottom-up adsorption mode a second of the two adsorption vessels is operating in a regeneration mode and when the first of the two adsorption vessels is switched to the regeneration mode, the second of the two adsorption vessels is switched to the bottom-up adsorption mode. The bottom-up adsorption mode comprises a vapor inlet stream comprising a hydrocarbon vapor flowing upwardly through the bed of the adsorbent material in the first or the second of the two adsorption vessels to remove at least most of the hydrocarbon vapor from the vapor inlet stream.

Following step (b), this method of extending the replacement period for the adsorbent material preferably comprises the step (c) of modifying the vapor recovery unit, without replacing the bed of the adsorbent material in either of the two adsorption vessels, by (i) opening the first, the second, the third, and the fourth connections, (ii) extending a line having a valve or a blind therein from the first connection to the second connection, and (iii) extending a line having a valve or a blind therein from the third connection to the fourth connection.

After step (c), this method of extending the replacement period for the adsorbent material preferably comprises the step (d) of operating the two adsorption vessels in alternating modes in which when the first of the two adsorption vessels is operating in a top-down adsorption mode the second of the two adsorption vessels is operating in a regeneration mode which is the same as or different from the regeneration mode of step (b) and when the first of the two adsorption vessels is switched to a regeneration mode which is the same as or different from the regeneration stage of step (b) the second of the two adsorption vessels is switched to the top-down adsorption mode. The top-down adsorption mode comprises the vapor inlet stream comprising the hydrocarbon vapor flowing downwardly through the bed of the adsorbent material in the first or the second of the two adsorption vessels to remove at least most of the hydrocarbon vapor from the vapor inlet stream.

In another aspect, there is provided a vapor recovery system for recovering a hydrocarbon vapor from a vapor inlet stream. The vapor recovery system preferably comprises a plurality of adsorption vessels. Each of the adsorption vessels preferably has a bed of an adsorbent material therein and, for each of the adsorption vessels, the vapor recovery system preferably further comprises: (a) a first inlet vapor line for the vapor inlet stream which is connected to a bottom-up inlet flow connection of the adsorption vessel, the bottom-up inlet flow connection being located below the bed of the adsorbent material so that the bottom-up inlet flow connection causes the vapor inlet stream to flow upwardly through the bed of the adsorbent material, the first inlet vapor line having a first inlet valve therein; (b) a second inlet vapor line extending from the first inlet vapor line to a top-down inlet flow connection of the adsorption vessel, the second inlet vapor line having a second inlet valve or blind therein and the top-down inlet flow connection of the adsorption vessel being located above the bed of the adsorbent material and/or having an internal line and/or an internal flow distributor which extends from the top-down inlet flow connection and has a discharge located inside the adsorption vessel above the bed of the adsorbent material so that the top-down inlet flow connection causes the vapor inlet stream to flow downwardly through the bed of the adsorbent material: (c) a vacuum draw line which extends from the first inlet vapor line downstream of the first inlet valve and is in direct or indirect communication with a suction of a vacuum pump or other vacuum draw device, the vacuum draw line having a vacuum line valve therein; (d) a first vent line which extends from a vent outlet of the adsorption vessel located above the bed of the adsorbent material, the first vent line having a first vent valve therein; and (e) a second vent line which extends to the first vent line from either (i) the vacuum draw line upstream of the vacuum line valve or (ii) the first inlet vapor line downstream of the first inlet valve, the second vent line having a second vent valve or blind therein.

Further aspects, features, and advantages of the present invention will be apparent to those in the art upon examining the accompanying drawings and upon reading the following Detailed Description of the Preferred Embodiments.

DETAILED DESCRIPTION OF THE PREFERRED EMBODIMENTS

As mentioned above, the method, system, and apparatus of the present invention operate, in one aspect, to extend the replacement period of the activated carbon or other adsorbent material used in a vapor recovery unit (VRU) by allowing the bed of adsorbent material to transition, either once or repeatedly, between a bottom-up flow/adsorption mode and a top-down flow/adsorption mode.

Figure 1:
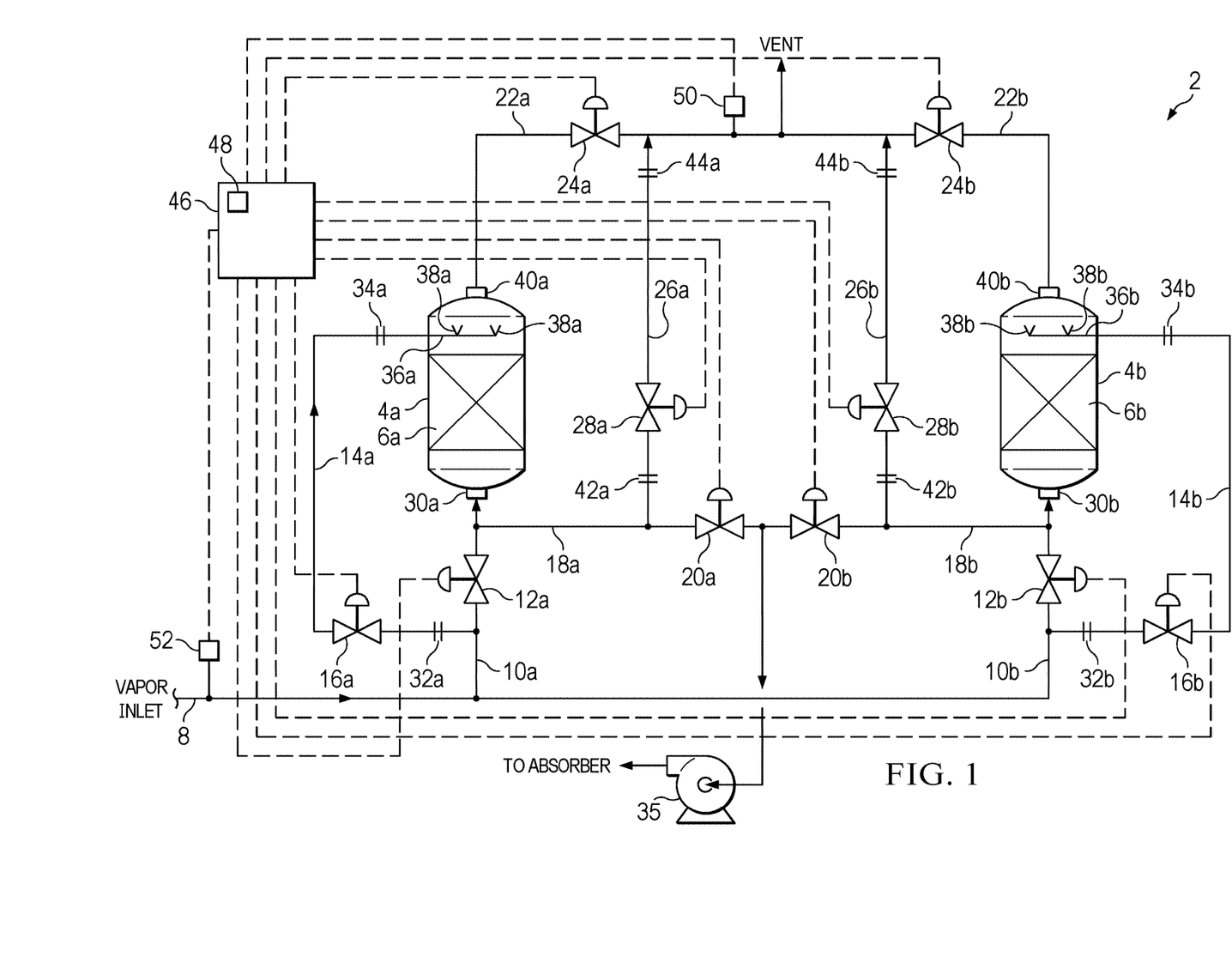
FIG. 1 schematically illustrates an embodiment 2 of the vapor recovery system and apparatus provided by the present invention.

An embodiment 2 of the inventive vapor recovery apparatus and system is illustrated in FIG. 1. The inventive VRU system 2 preferably comprises one or more, preferably two, vertical adsorption vessels 4a and 4b, each of which has a bed 6a or 6b of solid adsorbent material therein. Examples of solid adsorbent materials suitable for use in the inventive system 2 include, but are not limited to, activated carbon (also referred to in the art as activated charcoal), silica gel, and porous minerals such as alumina and silica. The adsorbent material will preferably be activated carbon.

By way of example, but not by way of limitation, the inventive VRU system 2 receives a vapor inlet stream 8 of the type released when loading tanker trucks, railway tank cars, tanker ships, and other vessels with gasoline, diesel, or other hydrocarbon liquids. The vapor inlet stream 8 comprises a hydrocarbon vapor and will typically comprise a mixture of the hydrocarbon vapor and air.

For each of the one or more adsorption vessels 4a or 4b, the inventive VRU system 2 preferably comprises: (a) a first inlet vapor line 10a or 10b for the vapor inlet stream 8; (b) a first inlet valve 12a or 12b provided in the first inlet line 10a or 10b; (c) a second inlet vapor line 14a or 14b for the vapor inlet stream 8; (d) a second inlet valve 16a or 16b provided in the second inlet line 14a or 14b; (e) a vacuum draw line 18a or 18b having a vacuum line valve 20a or 20b therein; (t) a first vent line 22a or 22b having a first vent valve 24a or 24b therein; and (g) a second vent line 26a or 26b having a second vent valve 28a or 28b therein.

The first vapor inlet line 10a or 10b is connected to a bottom-up inlet flow connection 30a or 30b of the adsorption vessel 4a or 4b which is located below the bed of adsorbent material 6a or 6b. The bottom-up inlet flow connection 30a or 30b directs or otherwise causes the vapor inlet stream to flow upwardly through the bed of the adsorbent material 6a or 6b.

The second inlet vapor line 14a or 14b extends from (a) a connection 32a or 32h in the first inlet vapor line 10a or 10b upstream of the first inlet valve 12a or 12b to (b) a top-down inlet flow connection 34a or 34b of the adsorption vessel 4a or 4b. The top-down inlet flow connection 34a or 34b is located above the bed 6a or 6b of the adsorbent material in the vessel 4a or 4b, and/or includes an internal line and/or an internal flow distributor 36a or 36b. The internal line and/or flow distributor 36a or 36b extends inside the adsorption vessel 4a or 4b from the top-down inlet flow connection 34a or 34b and has a discharge 38a or 38b which is located inside the adsorption vessel 4a or 4b above the bed of adsorbent material 6a or 6b. Consequently, if, for example, the top-down inlet flow connection 34a or 34b is located below rather than above the bed 6a or 6b of adsorbent material, an internal line and/or internal flow distributer 36a or 36b will extend upwardly in the adsorption vessel 4a or 4b, e.g., through the bed 6a or 6b of adsorbent material, to discharge the inlet vapor stream 8 above the adsorbent bed 6a or 6b.

The top-down inlet flow connection 34a or 34b and/or the internal line and/or flow distributor 36a or 36b are therefore effective for discharging the vapor inlet stream above the adsorbent bed 6a or 6b in a manner such that the vapor inlet stream is either directly or indirectly caused to flow downwardly through the bed of adsorbent material 6a or 6b.

In order to provide more even flow through the adsorbent bed 6a or 6b when operating in a top-down adsorption cycle, the top-down inlet flow connection 34a or 34b for each adsorption vessel 4a or 4b preferably includes an internal line and/or flow distributor 36a or 36b having a discharge 38a or 38b, positioned above the adsorbent bed 6a or 6b, which comprises an upwardly facing pipe outlet or one or more, preferably a plurality, of upwardly facing conical discharge nozzles or other discharge nozzles or outlets which discharge the vapor inlet stream 8 upwardly in the adsorption vessel 4a or 4b such that the vapor inlet stream 8 flows into contact with the interior of the upper head of the vessel 4a or 4b and is then caused to flow downwardly into the top of the adsorbent bed 6a or 6b.

It will be understood, however, that the top-down inlet flow connection 34a or 34b, and/or the internal line and/or flow distributor 36a or 36b, could alternatively discharge the inlet vapor stream 8 downwardly into the bed 6a or 6b of adsorbent material or could discharge the inlet vapor stream 8 at any other angle above the adsorbent bed 6a or 6b.

The vacuum draw line 18a or 18b extends from the first inlet vapor line 10a or 10b downstream of the first inlet valve 12a or 12b and is in direct or indirect communication with the suction of a vacuum draw device 35. The vacuum draw device 35 can generally be any type of vacuum pump or other pressure reduction device which is effective for sufficiently reducing the pressure in the adsorption vessel 4a or 4b during the regeneration stage of the vapor recovery process to release (desorb) and recover the hydrocarbon vapor which was adsorbed by the bed of adsorption material 6a or 6b during the adsorption stage.

The first vent line 22a or 22b extends from a vent outlet 40a or 40b of the adsorption vessel 4a or 4b which is located above the bed of adsorbent material 6a or 6b. The second vent line 26a or 26b has an inlet end which is connected to a connection 42a or 42b which is provided either (i) on the vacuum draw line 18a or 18b upstream of the vacuum line valve 20a or 20b or (ii) on the first inlet vapor line 10a or 10b downstream of the first inlet valve 12a or 12b. The second vent line 26a or 26b extends from the connection 42a or 42b to a connection 44a or 44b on the first vent line 22a or 22b downstream of the first vent valve 24a or 24b.

The inventive VRU system 2 can also include a control system 46 comprising a controller 48 which is electronically, pneumatically, or otherwise linked to the first inlet valves 12a and 12b, the second inlet valves 16a and 16b, the first vent valves 24a and 24b, the second vent valves 28a and 28b, and the vacuum line valves 20a and 20b. The control system 46 is preferably programmed and operable for (a) automatically and repeatedly transitioning each adsorption vessel 4a and 4b between a regeneration mode and a bottom-up adsorption mode and (b) automatically and repeatedly transitioning each adsorption vessel 4a and 4b between the regeneration mode and a top-down adsorption mode.

In the regeneration mode for each adsorption vessel 4a or 4b, the VRU system 2 is automatically configured by the control system 46 such that the vacuum line valve 20a or 20b is open and the first inlet valve 12a or 12b, the second inlet valve 16a or 16b, the first vent valve 24a or 24b, and the second vent valve 28a or 28b are closed.

To take each adsorption vessel 4a or 4b from the regeneration mode to a bottom-up adsorption mode in which the vapor inlet stream 8 flows upwardly through the adsorbent bed 6a or 6b, the control system 46 automatically closes the vacuum line valve 20a or 20b and opens the first inlet valve 12a or 12b and the first vent valve 24a or 24b. Alternatively, to take each adsorption vessel from the regeneration mode to a top-down adsorption mode in which the vapor inlet stream 8 flows downwardly through the adsorbent bed 6a or 6b, the control system 46 automatically closes the vacuum line valve 20a or 20b and opens the second inlet valve 16a or 16b and the second vent valve 28a or 28b.

In another aspect, the control system 46 can also optionally be programmed to automatically operate each adsorption vessel 4a or 4b to maintain the adsorption vessel 4a or 4b in a bottom-up adsorption cycle (in which the vessel 4a or 4b repeatedly alternates between the bottom-up adsorption mode and the regeneration mode) for a set period of time. In yet another aspect, the control system 46 can alternatively be programmed to automatically operate the adsorption vessel 4a or 4b in the regeneration mode, or in the bottom-up adsorption mode, just once, or for any other set number of times, before transitioning the adsorption vessel 4a or 4b to a top-down adsorption cycle. In yet another aspect, the control system 46 can alternatively or additionally be programmed to (a) maintain the adsorption vessel 4a or 4b in a top-down adsorption cycle (in which the vessel 4a or 4b repeatedly alternates between the top-down adsorption mode and the regeneration mode) for a set period of time or (b) cause the adsorption vessel 4a or 4b to operate in the regeneration mode, or in the top-down adsorption mode, just once, or for any other set number of times, before transitioning the adsorption vessel 4a or 4b to the bottom-up adsorption mode.

In addition, the control system 46 can optionally be programmed to automatically monitor a hydrocarbon emission level of the vent stream discharged from at least one of the adsorption vessels 4a or 4b, when operating in the bottom-up adsorption cycle and/or the top-down adsorption cycle, using an analyzer 50 positioned in the first vent line 22a or 22b of the adsorption vessel 4a or 4b. The control system 46 can also optionally be programmed to switch the adsorption vessel 4a or 4b from the bottom-up adsorption cycle to the top-down adsorption cycle, or from the top-down adsorption cycle to the bottom-up adsorption cycle, based upon the hydrocarbon emission level (e.g., when a pre-set emissions level, such as a regulatory or other emissions limit, is reached).

Alternatively, or in addition to monitoring the hydrocarbon emission level from one or more of the adsorption vessels 4a and 4b, samples of the adsorbent material in the adsorbent beds 6a and 6b can be pulled to determine when to change from a bottom-up adsorption cycle to a top-down adsorption cycle, or vice versa, and when to replace the beds of adsorbent material 6a and 6b.

Alternatively, or in addition, the control system 46 can optionally be programmed to automatically: (i) monitor a hydrocarbon emission level of the vent stream discharged from at least one of the adsorption vessels 4a or 4b using the analyzer 50 when operating in a bottom-up adsorption cycle and/or a top-down adsorption cycle; (ii) monitor a hydrocarbon content of the vapor inlet stream 8 using an analyzer 52; and (iii) trend the hydrocarbon emission level of the vent stream and the hydrocarbon content of the vapor inlet stream 8 to provide a prediction, e.g., of a point in time or a number of regeneration and adsorption cycles, when a pre-set emissions level, such as a regulatory emissions limit or other emissions limit, will be reached for switching the one or more adsorption vessels 4a or 4b from the bottom-up adsorption cycle to the top-down adsorption cycle, or from the top-down adsorption cycle to the bottom-up adsorption cycle, or for replacing the beds of adsorbent material 6a or 6b.

The embodiment 2 of the inventive VRU system as illustrated in FIG. 1 is a completed embodiment of the inventive system 2. In an alternative embodiment of the inventive system 2, referred to herein as the intermediate VRU system 2, the inventive system 2 is provided in a form which does not initially include (i) the second vapor inlet line 14a or 14b, (ii) the second inlet valve 16a or 16b. (iii) the second vent line 26a or 26b, and (iv) the second vent valve 28a or 28b. Instead, the connections 32a and 32b on the first inlet vapor lines 10n and 10b, the top-down inlet flow connections 34a and 34b of the adsorption vessels 4a and 4b, the connections 42a and 42b on the vacuum draw lines 18a and 18b (or on the first inlet vapor lines 10a and 10b), and the connections 44a and 44b on the first vent lines 22a and 22b are closed, e.g., by a blind flange or by any other type of closure.

The option of initially providing the inventive VRU system 2 in this intermediate form reduces the initial cost of the system and allows the user to later install the second vapor inlet lines 14a and 14b and the second vent lines 26a and 26b when needed (e.g., when the bottom one-third of each bed of adsorbent material 6a or 6b is spent, such as when the adsorption efficiency of the lower section of the bed 6a or 6b has declined by 25%, or 30%, or 35%, or 40% or more, but preferably not more than 60%, 65%, 70%, or 75%), by means of a quick field retrofit, so that the beds 6a and 6b can then be switched to the top-down adsorption mode rather than having to replace the adsorbent beds 6a and 6b at that time with new adsorbent material. This extends the life of the existing absorbent beds 6a and 6b so that the funds which would have otherwise been required to replace the adsorbent beds 6a and 6b can instead be used to pay for the added lines and valves.

In the method of the present invention using the completed VRU system 2 as illustrated in FIG. 1, each of the one or more adsorption vessels 4a and 4b is operated, during the course of the inventive method, in one or more bottom-up cycles in which each adsorption vessel 4a or 4b once or repeatedly operates in a bottom-up adsorption mode followed by a regeneration mode. In the bottom-up adsorption mode, the vapor inlet stream 8 comprising a hydrocarbon vapor flows upwardly through the bed of adsorbent material 6a or 6b in the adsorption vessel 4a or 4b to remove the hydrocarbon vapor from the vapor inlet stream 8. In the regeneration mode, the delivery of the vapor inlet stream 8 through the bed of adsorbent material 6a or 6b in the adsorption vessel 4a or 4b is stopped and the pressure in the adsorption vessel 4a or 4b is reduced using the vacuum pump or other vacuum draw device 35.

Also during the course of the inventive method using the completed VRU system 2, the one or more bottom-up cycles are alternated with one or more top-down cycles. In each of the top-down cycles, each of the adsorption vessels 4a or 4a is once or repeatedly operated in a top-down adsorption mode followed by a regeneration mode. In the top-down adsorption mode, the vapor inlet stream 8 flows downwardly through the bed of adsorbent material 6a or 6b in the adsorption vessel 4a or 4b to remove the hydrocarbon vapor from the vapor inlet stream. In the regeneration mode, the delivery of the vapor inlet stream 8 through the bed of adsorbent material 6a or 6b in the adsorption vessel 4a or 4b is stopped and the pressure in the adsorption vessel 4a or 4b is reduced using the vacuum pump or other vacuum draw device 35.

When using the completed VRU system 2 as illustrated in FIG. 1, the initial cycle used in the inventive method can be either a bottom-up cycle or a top-down cycle. In addition, the respective lengths and numbers of the various bottom-up and top-down cycles can be the same or different. In addition, when one of the adsorption vessels 4a or 4b is operating a bottom-up cycle, the other adsorption vessel 4a or 4b can be operated in either a bottom-up cycle or a top-down cycle. Similarly, when one of the adsorption vessels 4a or 4b is operating a top-down cycle, the other adsorption vessel 4a or 4b can be operated in either a top-down cycle or a bottom-up cycle.

The total number and duration of all of the one or more bottom-up cycles conducted in the inventive method will preferably be such that adsorption efficiency of the bottom one-third of the bed of adsorbent material 6a or 6b in each adsorption vessel 4a or 4b is reduced by at least 25% (more preferably at least 30% and more preferably at least 35%), but preferably not more than 75% (more preferably not more than 70%, more preferably not more than 65% and more preferably not more than 60%), before replacing the beds of adsorbent material 6a and 6b.

Similarly, the total number and duration of all of the one or more top-down cycles conducted in the inventive method will preferably be such that adsorption efficiency of the top one-third of the bed of adsorbent material 6a or 6b in each adsorption vessel 4a or 4b is reduced by at least 25% (more preferably at least 30% and more preferably at least 35%) but preferably not more than 75% (more preferably not more than 70%, more preferably not more than 65%, and more preferably not more than 60%), before replacing the beds of adsorbent material 6a and 6b.

Once the efficiency of both the bottom one-third and the top one-third of the bed of adsorbent material 6a or 6b in each adsorption vessel 4a and 4b has been reduced by at least 25% (more preferably at least 30% and more preferably at least 35%) but preferably not more than 75% (more preferably not more than 70%, more preferably not more than 65% and more preferably not more than 60%), each bed of adsorbent material 6a and 6b is preferably replaced in its entirety with new (fresh) adsorbent material.

The inventive method can also be manually and/or automatically conducted (e.g., using a control system 46) such that: (a) one or more of the bottom-up cycles is conducted for a set period of time; (b) one or more of the top-down cycles is conducted for a set period of time; (c) one or more of the bottom-up cycles is conducted to operate in the bottom-up adsorption mode and/or in the regeneration mode a set number of times; (d) one or more of the top-down cycles is conducted to operate in the top-down adsorption and/or the regeneration mode a set number of times; (e) a hydrocarbon emission level of the vent stream discharged from at least one adsorption vessel 4a or 4b is monitored when operating in the adsorption mode of the one or more bottom-up cycles and/or when operating in the adsorption mode of the one or more top-down cycles; (f) the one or more adsorption vessels 4a or 4b are switched from a bottom-up cycle to a top-down cycle, or from a top-down cycle to a bottom-up cycle, based upon the hydrocarbon emission level; (g) a hydrocarbon vapor content of the vapor inlet stream 8 is monitored; and/or (h) the hydrocarbon emission level of the vent stream and the hydrocarbon content of the vapor inlet stream 8 are trended to provide a prediction of when a desired point will be reached for switching the one or more adsorption vessels 4a or 4b from a bottom-up cycle to a top-down cycle, switching the one or more adsorption vessels 4a or 4b from a top-down cycle to a bottom-up cycle, or replacing the beds of adsorbent material 6a and 6b.

It will also be understood by those in the art that, when operating an inventive VRU system 2 having a pair of adsorption vessels 4a and 4b as illustrated in FIG. 1, a first one of the adsorption vessels 4a will be operated in either a bottom-up adsorption mode or a top-down adsorption mode whenever the second adsorption vessel 4b is operating in a regeneration mode and, when the first adsorption vessel 4a is switched to a regeneration mode, the second adsorption vessel 4b will be switched to either a bottom-up adsorption mode or a top-down adsorption mode.

When the VRU system 2 is initially provided in the intermediate form described above, the operation of the intermediate VRU system 2 in accordance with the inventive method will be essentially the same as the operation of the completed VRU system 2 except that (i) the operation of the intermediate system 2 must begin in a bottom-up adsorption cycle and (ii) at the end of this initial cycle, the intermediate VRU system 2 must be shut down and the second vapor inlet lines 14a and 14b, the second inlet valves 16a and 16b, the second vent lines 26a and 26b, and the second vent valves 28a and 28b must be installed to convert the intermediate system to a completed VRU system 2 prior to transitioning the VRU system 2 to a top-down adsorption cycle.

Also when beginning with the intermediate VRU system 2, although multiple alternating bottom-up and top-down adsorption cycles could still be used after converting the intermediate system 2 to a completed system 2, the system 2 will typically be operated in only one bottom-up adsorption cycle, which is performed prior to converting the intermediate system 2 to a completed system 2, and only one top-down adsorption cycle, which is performed after converting the intermediate system 2 to a completed system 2. The bottom-up adsorption cycle performed prior to converting the intermediate system 2 to the completed system 2 will preferably be continued until the adsorption efficiency of the bottom one-third of the bed of adsorbent material 6a or 6b in each adsorption vessel 4a and 4b has been reduced by at least 25% (more preferably at least 30% and more preferably at least 35%) but preferably not more than 75% (more preferably not more than 70%, more preferably not more than 65%, and more preferably not more than 60%). Similarly, the top-down adsorption cycle performed after converting the intermediate system 2 to the completed system 2 will preferably be continued until the adsorption efficiency of the top one-third of the bed of adsorbent material 6a or 6b in each adsorption vessel 4a and 4b has been reduced by at least 25% (more preferably at least 30% and more preferably at least 35%) but preferably not more than 75% (more preferably not more than 70%, more preferably not more than 65%, and more preferably not more than 60%). Then, following the completion of both the pre-conversion bottom-up cycle and the post-conversion top-down cycle, the adsorbent beds 6a and 6b in the adsorption vessels 4a and 4b will preferable be replaced with fresh adsorbent material.

During the bottom-up adsorption cycle conducted prior to converting the intermediate VRU system 2 to a completed VRU system 2, the adsorption vessels 4a and 4b of the inventive system 2 are repeatedly operated in alternating modes in which, when vessel 4a is operating in a bottom-up adsorption mode, vessel 4b is operating in a regeneration mode, and when vessel 4a is switched to the regeneration mode, vessel 4b is switched to the bottom-up adsorption mode.

After the completion of the bottom-up adsorption cycle, and after the intermediate VR U system is shut down (without replacing the adsorbent beds 6a and 6b in the adsorption vessels 4a and 4b), the intermediate system 2 is preferably converted to the completed inventive VRU system 2 by (i) opening the connections 32a. 32b, 34a, 34b, 42a, 42b, 44a, and 44b so that these connections are no longer closed, (ii) extending the second vapor inlet line 14a having valve 16a therein from connection 32a to connection 34a, (iii) extending the second vapor inlet line 14b having valve 16b therein from connection 32b to connection 34b; (iv) extending the second vent line 26a having valve 28a therein from connection 42a to connection 44a; and (v) extending the second vent line 26b having valve 28b therein from connection 42b to connection 44b.

During the top-down adsorption cycle conducted after converting the intermediate VRU system 2 to a completed VRU system 2, the adsorption vessels 4a and 4b of the inventive system 2 are repeatedly operated in alternating modes in which when vessel 4a is operating in a top-down adsorption mode, vessel 4a is operating in a regeneration mode, and when vessel 4a is switched to the regeneration mode, vessel 4b is switched to the top-down adsorption mode.

The conversion of the intermediate VRU system 2 to the completed VRU system 2 will preferably be performed from 4 to 11 years after the pre-conversion bottom-up adsorption cycle begins. The eventual replacement of the beds of adsorbent material 6a and 6b in the adsorption vessels 4a and 4b will preferably not be performed until from 2 to 6 years after the post-conversion top-down adsorption cycle begins.

In a third embodiment of the inventive VRU system 2, the system as initially provided could include the second vapor inlet lines 14a and 14b and the second vent lines 26a and 26b but with dropout spools provided in the lines 14a. 14b, 26a, and 26b for later installation of the second inlet valves 16a and 16b and the second vent valves 28a and 28b, thus allowing the third embodiment of the inventive system to be used and exploited, e.g., in essentially the same manner as the intermediate VRU system 2.

Figure 2:
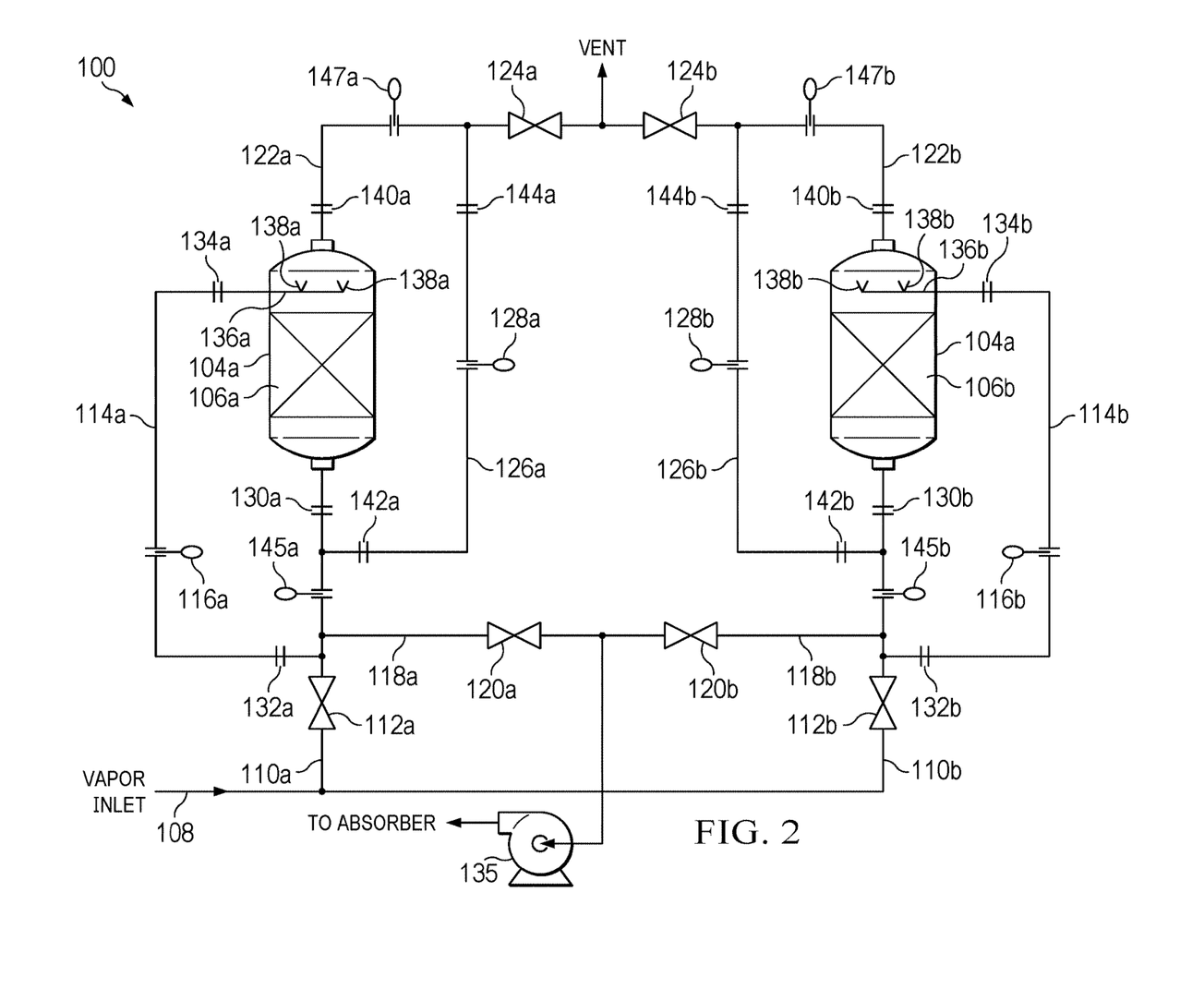
FIG. 2 schematically illustrates an alternative embodiment 100 of the vapor recovery system and apparatus provided by the present invention.

Another alternative embodiment 100 of the inventive VRU system and apparatus is illustrated in FIG. 2. The inventive system 100 preferably comprises one or more, preferably two, vertical adsorption vessels 104a and 104b, each of which has a bed 106a or 106b of activated carbon or other solid adsorbent material therein.

The inventive VRU system 100 is configured and operates in substantially the same manner as the inventive system 2 except that the inventive system 100 allows the vacuum draw point for each of the adsorption vessels 104a and 104b to be changed, if desired, such that (a) when operating in the regeneration mode of a bottom-up adsorption cycle, the pressure in the adsorption vessel 104a or 104b can be reduced by drawing a vacuum from below the bed of the adsorbent material 106a or 106b in the adsorption vessel 104a or 104b and (b) when operating in the regeneration mode of a top-down adsorption cycle, the pressure in the adsorption vessel 104a or 104b can be reduced by instead drawing a vacuum from above the bed of the adsorbent material 106a or 106b. In the event that the adsorbents beds 106a or 106b are somehow overloaded during operation, an emissions exceedance will be less likely to occur if, during regeneration, the vacuum is drawn from the end of adsorbent bed 106a or 106b which is most saturated with the hydrocarbon vapor (i.e., the end of the adsorbent bed 106a or 106b into which the vapor inlet stream 108 is delivered).

For each of the one or more adsorption vessels 104a or 104b, the inventive VRU system 100 preferably comprises: (a) a first inlet vapor line 110a or 110b for the vapor inlet stream 108; (b) a first inlet valve 112a or 112b provided in the first inlet line 110a or 110b; (c) a second inlet vapor line 114a or 114b for the vapor inlet stream 108; (d) a slip blind or other blind (or a manual valve or automated valve) 116a or 116b provided in the second inlet line 114a or 114b; (e) a vacuum draw line 118a or 118b having a vacuum line valve 120a or 120b therein; (f) a first vent line 122a or 122b having a first vent valve 124a or 124b therein; and (g) a second vent line 126a or 126b having a slip blind or other blind (or a manual valve or automated valve) 128a or 128b therein.

The first vapor inlet line 110a or 110b is connected to a bottom-up inlet flow connection 130a or 130b of the adsorption vessel 104a or 104b which is located below the bed of adsorbent material 106a or 106b. The bottom-up inlet flow connection 130a or 130b directs or otherwise causes the vapor inlet stream 108 to flow upwardly through the bed of the adsorbent material 106a or 106b.

The second inlet vapor line 114a or 114b extends from (a) a connection 132a or 132b in the first inlet vapor line 110a or 110b downstream of the first inlet valve 112a or 112b to (b) a top-down inlet flow connection 134a or 134b of the adsorption vessel 104a or 104b. The top-down inlet flow connection 134a or 134b is located above the bed 106a or 106b of the adsorbent material in the vessel 104a or 104b, and/or includes an internal line and/or an internal flow distributor 136a or 136b. The internal line and/or flow distributor 136a or 136b extends inside the adsorption vessel 104a or 104b from the top-down inlet flow connection 134a or 134b and has a discharge 138a or 138b which is located inside the adsorption vessel 104a or 104b above the bed of adsorbent material 106a or 106b. Consequently, if, for example, the top-down inlet flow connection 134a or 134b is located below rather than above the bed 106a or 106b of adsorbent material, the internal line and/or internal flow distributer 136a or 136b will extend upwardly in the adsorption vessel 104a or 104b, e.g., through the bed 106a or 106b of adsorbent material, to discharge the inlet vapor stream 108 above the adsorbent bed 106a or 106b.

The top-down inlet flow connection 134a or 134b and/or the internal line and/or flow distributor 136a or 136b are therefore effective for discharging the vapor inlet stream 108 above the adsorbent bed 106a or 106b in a manner such that the vapor inlet stream 108 is either directly or indirectly caused to flow downwardly through the bed of adsorbent material 106a or 106b.

The vacuum draw line 118a or 118b extends from the first inlet vapor line 110a or 110b downstream of the first inlet valve 112a or 112b and is in direct or indirect communication with the suction of a vacuum pump or other vacuum draw device 135.

The first vent line 122a or 122b extends from a vent outlet 140a or 140b of the adsorption vessel 104a or 104b which is located above the bed of adsorbent material 106a or 106b.

The second vent line 126a or 126b has an inlet end which is connected to a connection 142a or 142b which is provided on the first inlet vapor line 110a or 110b downstream of the first inlet valve 112a or 112b. In addition, the first inlet vapor line 110a or 110b includes a slip blind or other blind (or a manual valve or automated valve) 145a or 145b which is located in the first inlet vapor line 110a or 110b between (i) the connection 142a or 142b for the inlet of the second vent line 126a or 126b and (i) the inlet of the vacuum draw line 118a or 118b.

The second vent line 126a or 126b extends from the connection 142a or 142b to a connection 144a or 144b on the first vent line 122a or 122b upstream of the first vent valve 124a or 124b. In addition, the first vent line 122a or 122b includes a slip blind or other blind (or a manual valve or automated valve) 147a or 147b which is located in the first vent line 122a or 122b upstream of the connection 144a or 144b for the second vent line 126a or 126b.

When operating either the adsorption vessel 104a or the adsorption vessel 104b in a bottom-up cycle in which the adsorption vessel 104a or 104b transitions once or repeatedly from (i) a bottom-up adsorption mode to (ii) a regeneration mode in which the pressure in the adsorption vessel 104a or 104b is reduced by drawing a vacuum from below the adsorbent bed 106a or 106b, the blind or valve 145a or 145b in the first vapor inlet line 110a or 110b and the blind or valve 147a or 147b in the first vent line 122a or 122b will be open during each stage of the entire bottom-up cycle and the blind or valve 116a or 116b in the second vapor inlet line 114a or 114b and the blind or valve 128a or 128b in the second vent line 126a or 126b will be closed.

To then take the adsorption vessel 104a or 104b from the bottom-up cycle to a top-down adsorption cycle in which the adsorption vessel 104a or 104b transitions once or repeatedly from (i) a top-down adsorption mode to (ii) a regeneration mode in which the pressure in the adsorption vessel 104a or 104b is reduced by drawing a vacuum from above the adsorbent bed 106a or 106b, the blind or valve 145a or 145b in the first vapor inlet line 110a or 110b and the blind or valve 147a or 147b in the first vent line 122a or 122b will be closed during each stage of the entire top-down cycle and the blind or valve 116a or 116b in the second vapor inlet line 114a or 114b and the blind or valve 128a or 128b in the second vent line 126a or 126b will be opened.

The use of slip blinds or manual valves 145a, 145b, 147a, 147b, 116a, 116b, 128a, and 128b in the inventive VRU system 100 reduces the cost of the system. However, these blinds or manual valves must be manually opened and close as needed when transitioning the adsorption drums 110a and 110b from a bottom-up adsorption and regeneration cycle to a top-down adsorption and regeneration cycle, and vice versa. On the other hand, if the blinds or manual valves 145a, 145b, 147a, 147b, 116a, 116b, 128a, and 128b are replaced with automated valves, the adsorption drums 104a and 104b can be automatically transitioned from the bottom-up adsorption and regeneration cycle to the top-down adsorption and regeneration cycle, and vice versa, by the control system of the inventive VRU unit 100.

Although not shown in FIG. 2, the first inlet valves 112a and 112b, the vacuum line valves 120a and 120b, and the first vent valves 124a and 124b will preferably be automated valves which are automatically controlled by the control system for the inventive VRU unit 100. When operating either of the adsorption vessels 104a or 104b in a bottom-up adsorption cycle, the control system is preferably programmed for (a) automatically closing the vacuum line valve 120a or 120b and automatically opening the first inlet valve 112a or 112b and the first vent valve 124a or 124b to transition the adsorption vessel 104a or 104b to the bottom-up adsorption mode in which the inlet vapor stream 108 is delivered upwardly through the adsorbent bed 106a or 106b in the vessel 104a or 104b and (b) automatically opening the vacuum line valve 120a or 120b and automatically closing the first inlet valve 112*a* or 112*b* and the first vent valve 124*a* or 124*b* to transition the adsorption vessel 104*a* or 104*b* to a regeneration mode in which the pressure in the vessel 104*a* or 104*b* is reduced by drawing a vacuum from below the adsorbent bed 106*a* or 106*b*.

When operating either of the adsorption vessels 104*a* or 104*b* in a top-down adsorption cycle, the control system of the inventive VRU system 100 is preferably programmed for (a) automatically closing the vacuum line valve 120*a* or 120*b* and automatically opening the first inlet vapor valve 112*a* or 112*b* and the first vent valve 124*a* or 124*b* to transition the adsorption vessel 104*a* or 104*b* to the top-down adsorption mode in which the inlet vapor stream 108 is delivered downwardly through the adsorbent bed 106*a* or 106*b* in the vessel 104*a* or 104*b* and (b) automatically opening the vacuum line valve 120*a* or 120*b* and automatically closing the first inlet valve 112*a* or 112*b* and the first vent valve 124*a* or 124*b* to transition the adsorption vessel 104*a* or 104*b* to a regeneration mode in which the pressure in the vessel 104*a* or 104*b* is reduced by drawing a vacuum from above the adsorbent bed 106*a* or 106*b*.

As with the control system 46 of the inventive VRU 2, the control system of the inventive VRU 100 can also be configured and programmed to monitor, and/or control the inventive VRU system 100 based upon, (a) the mount of time for which the adsorption vessel 104*a* or 104*b* has been operating in a bottom-up or top-down adsorption cycle, (b) the number of times in which the adsorption vessel 104*a* or 104*b* has been operated in the bottom-up adsorption mode during a bottom-up adsorption cycle and/or has been operated in the top-down adsorption mode during a top-down adsorption cycle, (c) the hydrocarbon emission level of the vent stream discharged from the adsorption vessel 104*a* or 104*b* when operating in the bottom-up adsorption cycle and/or the top-down adsorption cycle, and/or (d) both the hydrocarbon emission level from the adsorption vessel 104*a* or 104*b* and the hydrocarbon content of the vapor inlet stream 108.

In addition, like the inventive VRU system 2 described above, the inventive VRU system 100 can also be initially provided in an intermediate form which does not include the second vapor inlet lines 114*a* and 114*b* and the second vent lines 126*a* and 126. Instead, the connections 132*a* and 132*b* on the first inlet vapor lines 110*a* and 110*b*, the top-down inlet flow connections 134*a* and 134*b* of the adsorption vessels 104*a* and 104*b*, the connections 142*a* and 142*b* on the first inlet vapor lines 110*a* and 110*b*, and the connections 144*a* and 144*b* on the first vent lines 122*a* and 122*b* can be closed, e.g., by a blind flange or by any other type of closure.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. A method of extending a replacement period of an adsorbent material used in a vapor recovery unit, the vapor recovery unit comprising one or more adsorption vessels, each of the one or more adsorption vessels having a bed of the adsorbent material therein, and, for each one of the one or more adsorption vessels, the method comprising the steps of:
    a) operating the adsorption vessel in one or more bottom-up cycles, each of the one or more bottom-up cycles comprising once or repeatedly operating the adsorption vessel in a bottom-up adsorption mode followed by a regeneration mode, the bottom-up adsorption mode comprising flowing a vapor inlet stream comprising a hydrocarbon vapor upwardly through the bed of the adsorbent material in the adsorption vessel to remove at least most of the hydrocarbon vapor from the vapor inlet stream, and the regeneration mode comprising stopping the upward flow of the vapor inlet stream through the bed of the adsorbent material in the adsorption vessel and reducing a pressure in the adsorption vessel; and
    b) operating the adsorption vessel in one or more top-down cycles, each of the one or more top-down cycles comprising once or repeatedly operating the adsorption vessel in a top-down adsorption mode followed by a regeneration mode, the top-down adsorption mode comprising flowing the vapor inlet stream downwardly through the bed of the adsorbent material in the adsorption vessel to remove at least most of the hydrocarbon vapor from the vapor inlet stream, and the regeneration mode of step (b) comprising stopping the downward flow of the vapor inlet stream through the bed of the adsorbent material in the adsorption vessel and reducing the pressure in the adsorption vessel.

2. The method of claim 1 further comprising the steps of:
    c) conducting the one or more bottom-up cycles until an adsorption efficiency of a bottom one-third of the bed of the adsorbent material in the adsorption vessel is reduced by at least 25% but not more than 75%;
    d) conducting the one or more top-down cycles until an adsorption efficiency of a top one-third of the bed of the adsorbent material in the adsorption vessel is reduced by at least 25% but not more than 75%; and
    e) replacing the bed of the adsorbent material in the adsorption vessel after steps (c) and (d).

3. The method of claim 1 further comprising a plurality of the bottom-up cycles of step (a) of identical or different lengths being alternated with a plurality of the top-down cycles of step (b) of identical or different lengths.

4. The method of claim 3 further comprising:
    each of the bottom-up cycles of step (a) comprising sequentially operating the adsorption vessel in the bottom-up adsorption mode followed by the regeneration mode of step (a) a plurality of times and
    each of the top-down cycles of step (b) comprising sequentially operating the adsorption vessel in the top-down adsorption mode followed by the regeneration mode of step (b) a plurality of times.

5. The method of claim 4 further comprising:
    one or more of the bottom-up cycles of step (a) being conducted for a set period of time and
    one or more of the top-down cycles of step (b) being conducted for a set period of time.

6. The method of claim 1 further comprising:
    one or more of the bottom-up cycles of step (a) being conducted by operating in the bottom-up adsorption mode and/or the regeneration mode of step (a) a set number of times and
    one or more of the top-down cycles of step (b) being conducted by operating in the top-down adsorption mode and/or the regeneration mode of step (b) a set number of times.

7. The method of claim 1 further comprising the adsorbent material being activated carbon.

8. The method of claim 1 further comprising:
the vapor recovery unit having two of the adsorption vessels with a first one of the adsorption vessels operating in the bottom-up adsorption mode of step (a) or the top-down adsorption mode of step (b) while a second one of the adsorption vessels operates in the regeneration mode of step (a) or the regeneration mode of step (b) and then
the first one of the adsorption vessels operating in the regeneration mode of step (a) or the regeneration mode of step (b) while the second one of the adsorption vessels operates in the bottom-up adsorption mode of step (a) or the top-down adsorption mode of step (b).

9. The method of claim 8 further comprising the second one of the adsorption vessels operating in either step (a) or step (b) when the first one of the adsorption vessels is operating in step (a).

10. The method of claim 1 further comprising the vapor inlet stream being discharged upwardly in the adsorption vessel above the bed of the adsorbent material in the top-down adsorption mode of step (b) and the vapor inlet stream then flowing downwardly through the bed of the adsorbent material.

11. The method of claim 1 further comprising the steps of:
monitoring a hydrocarbon emission level of a vent stream discharged from at least one of the one or more adsorption vessels when operating in the bottom-up adsorption mode of step (a) or the top-down adsorption mode of step (b) and
switching the one or more adsorption vessels from the bottom-up cycle of step (a) to the top-down cycle of step (b), or from the top-down cycle of step (b) to the bottom-up cycle of step (a), based upon the hydrocarbon emission level.

12. The method of claim 1 further comprising the steps of:
monitoring a hydrocarbon emission level of a vent stream discharged from one or more of the one or more adsorption vessels when operating in the bottom-up adsorption mode of step (a) or the top-down adsorption mode of step (b);
monitoring a hydrocarbon content of the vapor inlet stream; and
trending the hydrocarbon emission level of the vent stream and the hydrocarbon content of the vapor inlet stream to provide a prediction of when a desired point will be reached for switching the one or more adsorption vessels from the bottom-up cycle of step (a) to the top-down cycle of step (b), or from the top-down cycle of step (b) to the bottom-up cycle of step (a).

13. The method of claim 1 further comprising the vapor inlet stream comprising a mixture of the hydrocarbon vapor and air.

14. The method of claim 1 further comprising an initial cycle in which the adsorption vessel is operated being one of the one or more top-down cycles of step (b) and a second cycle in which the adsorption vessel is operated being one of the one or more bottom-up cycles of step (a).

15. The method of claim 1 further comprising
the pressure in the adsorption vessel being reduced in the regeneration mode of step (a) by drawing a vacuum from below the bed of the adsorbent material in the adsorption vessel and
the pressure in the adsorption vessel being reduced in the regeneration mode of step (b) by drawing a vacuum from above the bed of the adsorbent material in the adsorption vessel.

16. A method of vapor recovery in a vapor recovery unit, the vapor recovery unit comprising one or more adsorption vessels, each of the one or more adsorption vessels having a bed of an adsorbent material therein, and, for each one of the one or more adsorption vessels, the method comprising the steps of:
a) operating the adsorption vessel in one or more bottom-up cycles, each of the one or more bottom-up cycles comprising once or repeatedly operating the adsorption vessel in a bottom-up adsorption mode followed by a regeneration mode, the bottom-up adsorption mode comprising flowing a vapor inlet stream comprising a hydrocarbon vapor upwardly through the bed of the adsorbent material in the adsorption vessel to remove at least most of the hydrocarbon vapor from the vapor inlet stream, and the regeneration mode comprising stopping the flow of the vapor inlet stream through the bed of the adsorbent material in the adsorption vessel and reducing a pressure in the adsorption vessel by drawing a vacuum from below the bed of the adsorbent material in the adsorption vessel and
b) operating the adsorption vessel in one or more top-down cycles, each of the one or more top-down cycles comprising once or repeatedly operating the adsorption vessel in a top-down adsorption mode followed by a regeneration mode, the top-down adsorption mode comprising flowing the vapor inlet stream downwardly through the bed of the adsorbent material in the adsorption vessel to remove at least most of the hydrocarbon vapor from the vapor inlet stream, and the regeneration mode of step (b) comprising stopping the flow of the vapor inlet stream through the bed of the adsorbent material in the adsorption vessel and reducing the pressure in the adsorption vessel by drawing a vacuum from above the bed of the adsorbent material in the adsorption vessel.

17. The method of claim 16 further comprising a plurality of the bottom-up cycles of step (a) of identical or different lengths being alternated with a plurality of the top-down cycles of step (b) of identical or different lengths.

18. The method of claim 17 further comprising:
each of the bottom-up cycles of step (a) comprising sequentially operating the adsorption vessel in the bottom-up adsorption mode and then in the regeneration mode of step (a) a plurality of times and
each of the top-down cycles of step (b) comprising sequentially operating the adsorption vessel in the top-down adsorption mode and then in the regeneration mode of step (b) a plurality of times.

19. The method of claim 16 further comprising;
the vapor recovery unit having two of the adsorption vessels with a first one of the adsorption vessels operating in the bottom-up adsorption mode of step (a) or the top-down adsorption mode of step (b) while a second one of the adsorption vessels operates in the regeneration mode of step (a) or the regeneration mode of step (b) and then
the first one of the adsorption vessels operating in the regeneration mode of step (a) or the regeneration mode of step (b) while the second one of the adsorption vessels operates in the bottom-up adsorption mode of step (a) or the top-down adsorption mode of step (b).

20. A method of extending a replacement period for an adsorbent material used in a vapor recovery unit comprising the steps of:
a) providing a vapor recovery unit comprising two adsorption vessels, each of the two adsorption vessels having: (i) a bed of the adsorbent material therein, (ii) a first vapor inlet line connected to a lower inlet of the adsorption vessel located below the bed of the adsorbent material, (iii) a first vapor inlet valve provided in the first vapor inlet line, (iv) a vacuum draw line extending from the f vapor inlet line, (v) a vacuum line valve provided in the vacuum draw line, (vi) a first vent line extending from a vent outlet of the adsorption vessel located above the bed of the adsorbent material, and (vii) a first vent valve provided in the vent line;

b) operating the two adsorption vessels in alternating modes in which when a first of the two adsorption vessels is operating in a bottom-up adsorption mode a second of the two adsorption vessels is operating in a regeneration mode and when the first of the two adsorption vessels is switched to the regeneration mode, the second of the two adsorption vessels is switched to the bottom-up adsorption mode, the bottom-up adsorption mode comprising a vapor inlet stream comprising a hydrocarbon vapor flowing upwardly through the bed of the adsorbent material in the first or the second of the two adsorption vessels to remove at least most of the hydrocarbon vapor from the vapor inlet stream;

c) then, for each one of the two adsorption vessels, modifying the vapor recovery unit, without replacing the bed of the adsorbent material in the adsorption vessel, by (i) extending a second vapor inlet line having a valve or a blind therein from the first vapor inlet line for top-down adsorption in the adsorption vessel, and (ii) extending a second vent line having a valve or a blind therein from either the vacuum draw line or the first vapor inlet line to the first vent line; and d) then operating the two adsorption vessels in alternating stages in which when the first of the two adsorption vessels is operating in a top-down adsorption mode the second of the two adsorption vessels is operating in a regeneration mode which is the same as or different from the regeneration mode of step (b) and when the first of the two adsorption vessels is switched to the regeneration mode which is the same as or different from the regeneration mode of step (b) the second of the two adsorption vessels is switched to the top-down adsorption mode, the top-down adsorption mode comprising the vapor inlet stream comprising the hydrocarbon vapor flowing downwardly through the bed of the adsorbent material in the first or the second of the two adsorption vessels to remove at least most of the hydrocarbon vapor from the vapor inlet stream.

21. The method of claim 20 further comprising the adsorbent material being activated carbon and step (c) being performed from 4 to 11 years after beginning step (b).

22. The method of claim 20 further comprising:
the regeneration mode of step (b) comprising reducing a pressure in the first or the second of the two adsorption vessels by drawing a vacuum from below the bed of the adsorbent material in the first or the second of the two adsorption vessels and
the regeneration mode of step (d) comprising reducing the pressure in the first or the second of the two adsorption vessels by drawing a vacuum from above the bed of the adsorbent material in the first or the second of the two adsorption vessels.

23. A vapor recovery system for recovering a hydrocarbon vapor from a vapor inlet stream comprising a plurality of adsorption vessels, each of the adsorption vessels having a bed of an adsorbent material therein and, for each of the adsorption vessels, the vapor recovery system further comprising:

a first inlet vapor line for the vapor inlet stream which is connected to a bottom-up inlet flow connection of the adsorption vessel, the bottom-up inlet flow connection being located below the bed of the adsorbent material so that the bottom-up inlet flow connection causes the vapor inlet stream to flow upwardly through the bed of the adsorbent material, the first inlet vapor line having a first inlet valve therein;

a second inlet vapor line extending from the first inlet vapor line to a top-down inlet flow connection of the adsorption vessel, the second inlet vapor line having a second inlet valve or blind therein and the top-down inlet flow connection of the adsorption vessel being located above the bed of the adsorbent material and/or having an internal line and/or an internal flow distributor which extends from the top-down inlet flow connection and has a discharge located inside the adsorption vessel above the bed of the adsorbent material so that the top-down inlet flow connection causes the vapor inlet stream to flow downwardly through the bed of the adsorbent material;

a vacuum draw line which extends from the first inlet vapor line downstream of the first inlet valve and is in direct or indirect communication with a suction of a vacuum pump or other vacuum draw device, the vacuum draw line having a vacuum line valve therein;

a first vent line which extends from a vent outlet of the adsorption vessel located above the bed of the adsorbent material, the first vent line having a first vent valve therein; and a second vent line which extends to the first vent line from either (i) the vacuum draw line upstream of the vacuum line valve or (ii) the first inlet vapor line downstream of the first inlet valve, the second vent line having a second vent valve or blind therein.

24. The vapor recovery system of claim 23 further comprising the adsorbent material being activated carbon.

25. The vapor recovery system of claim 23 further comprising a control system which is operable for each of the adsorption vessels to (a) automatically take the adsorption vessel from a first regeneration mode to a bottom-up adsorption mode in which the vapor inlet stream flows upwardly through the bed of the adsorbent material in the adsorption vessel and/or (b) automatically take the adsorption vessel from a second regeneration mode, which is identical to or different from the first regeneration mode, to a top-down adsorption mode in which the vapor inlet stream flows downwardly through the bed of the adsorbent material in the adsorption vessel.

26. The vapor recovery system of claim 25 further comprising:
the control system operating in each of the adsorption vessels in the first regeneration mode to stop an upward flow of the vapor inlet stream through the bed of the adsorbent material in the adsorption vessel and reduce a pressure in the adsorption vessel by causing the vacuum pump or other vacuum draw device to draw a vacuum from below the bed of the adsorbent material in the adsorption vessel and/or
the control system operating in each of the adsorption vessels in the second regeneration mode to stop a downward flow of the vapor inlet stream through the bed of the adsorbent material in the adsorption vessel and reduce a pressure in the adsorption vessel by causing the vacuum pump or other vacuum draw device to draw a vacuum from above the bed of the adsorbent material in the adsorption vessel.

27. The vapor recovery system of claim 26 further comprising the control system operating for each of the adsorption vessels to automatically transition the adsorption vessel one or more times between (i) a bottom-up adsorption cycle in which the control system repeatedly alternates the adsorption vessel between the first regeneration mode and the bottom-up adsorption mode and (ii) a top-down adsorption cycle in which the control system repeatedly alternates the adsorption vessel between the second regeneration mode and the top-down adsorption mode.

28. The vapor recovery system of claim 27 further comprising the control system automatically operating for each of the adsorption vessels to maintain the adsorption vessel in at least one of the bottom-up adsorption cycle or the top-down adsorption cycle for a set period of time, or until the adsorption vessel has operated in the first or the second regeneration mode a set number of times, before transitioning the adsorption vessel to the other of the top-down adsorption cycle or the bottom-up adsorption cycle.

29. The vapor recovery system of claim 27 further comprising the control system automatically operating to:
monitor a hydrocarbon emission level of a vent stream discharged from at least one of the adsorption vessels when operating in the bottom-up adsorption cycle and/or when operating in the top-down adsorption cycle and
switch the adsorption vessels from the bottom-up adsorption cycle to the top-down adsorption cycle, or from the top-down adsorption cycle to the bottom-up adsorption cycle, based upon the hydrocarbon emission level.

30. The vapor recovery system of claim 27 further comprising the control system automatically operating to:
monitor a hydrocarbon emission level of a vent stream discharged from at least one of the adsorption vessels when operating in the bottom-up adsorption cycle and/or when operating in the top-down adsorption cycle;
monitor a hydrocarbon content of the vapor inlet stream; and
trend the hydrocarbon emission level of the vent stream and the hydrocarbon content of the vapor inlet stream to provide a prediction of when a desired point will be reached for switching the plurality of adsorption vessels from the bottom-up adsorption cycle to the top-down adsorption cycle, or from the top-down adsorption cycle to the bottom-up adsorption cycle.

31. The method of claim 20 further comprising:
the vapor recovery unit provided in step (a) also comprising each of the two adsorption vessels having: (viii) a first connection which is provided on the first vapor inlet line and is temporarily closed, (ix) a second connection which is located on a top-down vapor inlet of the adsorption vessel and is temporarily closed, the top-down vapor inlet being located above the bed of the adsorbent material and/or having an internal line and/or internal flow distributor which extends from the second connection and has a discharge located inside the adsorption vessel above the bed of the adsorbent material, (x) a third connection which is temporarily closed and is located either on the vacuum draw line upstream of the vacuum line valve or on the vapor inlet line, and (xi) a fourth connection which is located on the vent line and is temporarily closed and
in step (c), the first, the second, the third, and the fourth connections are opened, the second vapor inlet line is extended from the first connection to the second connection, and the second vent line is extended from the third connection to the fourth connection.

32. A vapor recovery system for recovering a hydrocarbon vapor from a vapor inlet stream comprising a plurality of adsorption vessels, each of the adsorption vessels having a bed of an adsorbent material therein and, for each of the adsorption vessels, the vapor recovery system further comprising:
a first inlet vapor line through which the vapor inlet stream is delivered to the adsorption vessel for upward flow through the bed of the adsorbent material, the first inlet vapor line having a first inlet valve or blind therein;
a second inlet vapor line, extending from the first inlet vapor line, through which the vapor inlet stream is delivered to the adsorption vessel for downward flow through the bed of adsorbent material, the second inlet vapor line having a second inlet valve or blind therein;
a vacuum draw line which extends from the first inlet vapor line and is in direct or indirect communication with a suction of a vacuum pump or other vacuum draw device;
a first vent line which extends from a vent outlet of the adsorption vessel located above the bed of the adsorbent material, the first vent line having a first vent valve or blind therein; and
a second vent line which extends to the first vent line from either (i) the vacuum draw line or (ii) the first inlet vapor line, the second vent line having a second vent valve or blind therein.

* * * * *

UNITED STATES PATENT AND TRADEMARK OFFICE
CERTIFICATE OF CORRECTION

PATENT NO. : 12,208,356 B1
APPLICATION NO. : 17/512760
DATED : January 28, 2025
INVENTOR(S) : Darton J. Zink et al.

Page 1 of 1

It is certified that error appears in the above-identified patent and that said Letters Patent is hereby corrected as shown below:

In the Claims

Claim 20, Column 19, Line 6; Change "f" to "first"

Signed and Sealed this
Fourth Day of March, 2025

Coke Morgan Stewart
*Acting Director of the United States Patent and Trademark Office*